Jan. 27, 1970     G. H. MYCROFT     3,492,044

AMPHIBIOUS STRUCTURE

Filed Jan. 8, 1968

INVENTOR
GEORGE H. MYCROFT

BY *Whittemore*
*Hulbert & Belknap*

ATTORNEYS

United States Patent Office 3,492,044
Patented Jan. 27, 1970

3,492,044
AMPHIBIOUS STRUCTURE
George H. Mycroft, Fairborn, Ohio
(621 Henley St., Manchester, Tenn. 37355)
Continuation-in-part of application Ser. No. 580,274,
Sept. 19, 1966, now Patent No. 3,362,373. This application Jan. 8, 1968, Ser. No. 696,467
Int. Cl. B60j 1/12, 7/02
U.S. Cl. 296—146                                     4 Claims

ABSTRACT OF THE DISCLOSURE

An amphibious vehicle is disclosed particularly including roof and door structure slidable longitudinally of the vehicle and a rear window mounted for pivoting about a transverse axis of the vehicle to provide flying bridge structure. Portions of the body structure as disclosed are also alternatively connected to the door structure and the vehicle body for providing a watertight body in the boating season and an easier entry into the vehicle at other times.

CROSS REFERENCE TO RELATED APPLICATIONS

This application is a continuation-in-part of application Ser. No. 580,274, filed Sept. 19, 1966, now U.S. Patent No. 3,362,373, which is a continuation-in-part of application Ser. No. 435,992, filed Mar. 1, 1965, now Patent No. 3,280,785, dated Oct. 25, 1966.

BACKGROUND OF THE INVENTION

Field of the invention

The invention relates to amphibious vehicles and refers more specifically to improved sliding door, roof and body structures for providing a flying bridge for the vehicle and easy entry into and out of the vehicle along with a watertight vehicle body during the boating season.

Description of the prior art

The best known prior art is that cited in the cross-referenced applications indicated above, none of which suggests an amphibious vehicle including roof and door structure constructed to slide longitudinally of the vehicle and open about longitudinally extending axes, a window mounted about a horizontal pivot axis to provide flying bridge structure in conjunction with an axially slidable roof portion or a body portion alternatively secured to the body of the vehicle and the door thereof to provide a watertight body for boating and easy entrance into the vehicle when it is not used for boating.

In the past boats have normally been provided with stationary flying bridge structures and bodies of solid construction. Similarly automobiles have generally been provided in the past with stationary roof and door structures with the door structures preventing the automobile body from being watertight.

SUMMARY OF THE INVENTION

It is therefore a purpose of the present invention to provide improved amphibious vehicle structure including slidable roof and door structure, flying bridge structure and structure for maintaining the vehicle body watertight when used as a boat and for providing easy entry into and out of the vehicle at other times.

More specifically the amphibious vehicle of the invention is provided with roof and door structure which is slidable longitudinally of the vehicle and which includes doors which pivot upward about centrally located longitudinal vehicle axes to permit entry into and exit from the vehicle.

The roof structure of the vehicle further includes a rear portion which is also slidable longitudinally of the vehicle and a rear window in the longitudinally slidable portion of the roof structure pivotally mounted at the top for movement about a horizontal pivot axis to provide a flying bridge for the amphibious vehicle used as a boat.

The structure for providing a watertight body for the vehicle when used as a boat comprises body portions and means for alternatively connecting the body portions to the vehicle body and to the vehicle doors, whereby the body portion is stationary with the body when the vehicle is used as a boat and is movable with the doors at other times.

DESCRIPTION OF THE PREFERRED EMBODIMENTS

Figure 1:
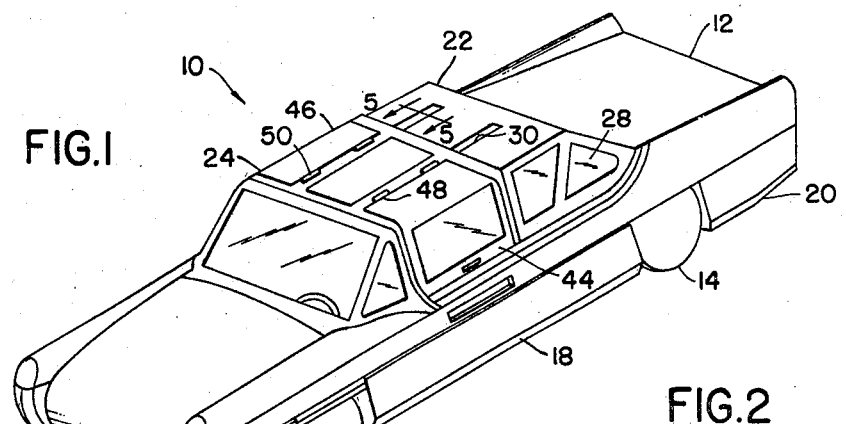
FIGURE 1 is a perspective view of amphibious vehicle structure constructed in accordance with the invention.

The amphibious vehicle structure 10 of the invention is more fully disclosed in the cross-referenced related applications. Briefly the amphibious vehicle 10 includes body structure 12, retractable wheel structure 14, wheel fairing structure 16, 18 and 20, the sliding roof structure 22, the roof and door structure 24 and steering and drive structure (not shown).

Figure 2:
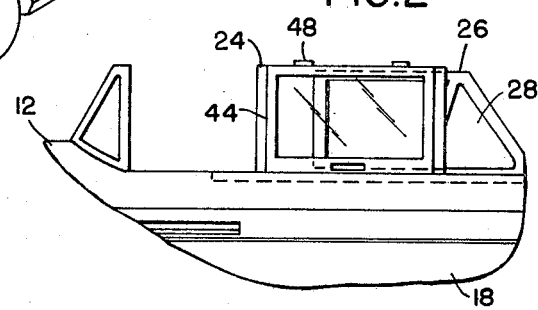
FIGURE 2 is an enlarged partial side elevation view of the vehicle structure illustrated in FIGURE 1 showing the roof and door structure in one position thereof.
Figure 3:
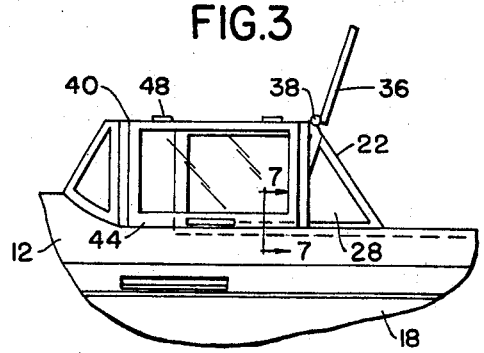
FIGURE 3 is another enlarged side elevation view of the roof and door structure of the amphibious vehicle illustrated in FIGURE 1.
Figure 7:
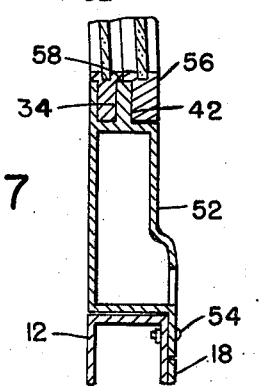
FIGURE 7 is an enlarged section view of the modified vehicle structure illustrated in FIGURE 6 taken substantially on the line 7—7 in FIGURE 6.

The sliding roof structure 22, as best shown in FIGURES 2, 3 and 7, includes a frame 26 having side windows 28 and T-slots 30 therein. The T-slots 30 receive T-shaped guide portions 32 of the roof and door structure 24 for guiding the roof and door structure 24 in movement over the sliding roof structure 22 or alternatively movement of the sliding roof structure 22 under the roof and door structure 24. The frame 26 is mounted for sliding longitudinally of the vehicle 10 in the grooves 34 provided in the vehicle body 12 at the upper sides of the passenger compartment of the vehicle 10, as best shown in FIGURE 7.

A rear vehicle window 36 is pivotally mounted to the frame structure 22 by the hinge means 38 extending transversely of the vehicle 10. Thus, the rear vehicle window 36 is movable into an upper pivoted position, as shown best in FIGURE 3, to provide a flying bridge for the amphibious vehicle 10 when used as a boat.

The roof and door structure 24 includes the frame 40 which is slidably mounted for movement longitudinally of the vehicle 10 in the recesses 42, as best shown in FIGURE 7. The frame 24 is guided in its sliding movement by the T-shaped guides 32 in the T-shaped slots in the frame 22, as previously indicated.

Figure 4:
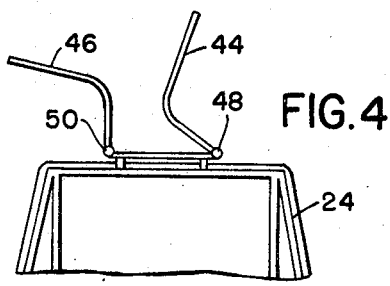
FIGURE 4 is an enlarged partial front view of the vehicle structure illustrated in FIGURE 1.
Figure 5:
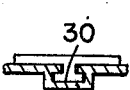
FIGURE 5 is an enlarged section view of the vehicle structure illustrated in FIGURE 1 taken substantially on the line 5—5 in FIGURE 1.

The doors 44 and 46 are mounted by the hinge means 48 and 50 on the frame 40 for pivotal movement into an upper position, as shown best in FIGURE 4, to permit easy entry into and exit from the vehicle. As shown, the doors 44 and 46 pivot about longitudinally extending axes of the vehicle 10.

Figure 6:
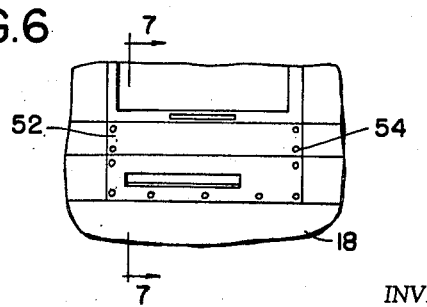
FIGURE 6 is an enlarged partial side elevation view of a modification of the vehicle structure illustrated in FIGURE 1.

In the modified vehicle structure illustrated in FIGURES 6 and 7, portions 52 of the vehicle body 12 on opposite sides of the vehicle 10 immediately beneath the doors 44 and 46 are removably attached to the body 12 by means of bolts 54 or the like and to the doors 44 and 46 by similar bolts (not shown), which are adapted to extend through the bottom portion 56 of the doors and into the part 58 of the body portions 52.

With the portions 52 of the body secured to the body 12, the body 12 is watertight so that the vehicle may be used as a boat. With the body portions 52 secured to the bottoms of the doors 44 and 46, entry into and exit from the vehicle 10 when not used as a boat is facilitated.

It will be understood that appropriate bearings to permit ready sliding of the roof 22 and roof and door structure 24 as well as weather and water seals for use between the sliding roof structures 22 and 24 and in conjunction with the body portions 52 may be provided if desired. Such structures will not therefore be shown in detail herein.

While one embodiment of the present invention and a modification thereof have been illustrated in detail, it will be understood that other embodiments and modifications are contemplated by the inventor. It is the intention to include all embodiments and modifications as are defined by the appended claims within the scope of the invention.

What I claim as my invention is:

1. A vehicle having a body, a roof portion and roof and door structure, said roof portion and roof and door structure being relatively movable longitudinally of the vehicle with respect to each other, means for guiding the roof portion and the roof and door structure in relative movement, separate doors at each side of the roof and door structure, hinge means connecting the doors to the roof and door structure for permitting swinging the doors of the roof and door structure upwardly and transversely of the vehicle to individually open the doors and permit standing in the vehicle, a vehicle rear window pivotally mounted on one of the roof portion and roof and door structure, and means pivotally mounting the vehicle rear window at the top thereof for tilting upward about a horizontal axis extending transversely of the vehicle whereby flying bridge structure is provided for the vehicle.

2. Structure as set forth in claim 1 wherein the roof portion of the vehicle is stationary.

3. Structure as set forth in claim 1 wherein at least the roof and door structure of the vehicle is movable longitudinally of the vehicle.

4. Structure as set forth in claim 1 and further including body portions and means for alternatively securing the body portions to the vehicle body and to the doors.

References Cited

UNITED STATES PATENTS

| | | | |
|---|---|---|---|
| 2,788,137 | 12/1954 | Harkness | 296—26 X |
| 3,212,810 | 10/1965 | Bass | 296—23.3 |
| 3,165,762 | 1/1965 | Hage | 9—1 |
| 2,127,580 | 8/1938 | Bartholowsky | 296—26 |
| 2,903,296 | 9/1959 | Barenyi | 296—146 |

PHILIP GOODMAN, Primary Examiner

U.S. Cl. X.R.

9—1